US006701146B2

(12) United States Patent
Choi

(10) Patent No.: US 6,701,146 B2
(45) Date of Patent: Mar. 2, 2004

(54) METHOD FOR CALCULATING CALL PROCESSING CAPACITY OF MOBILE COMMUNICATION SYSTEM USING INTERNET COMMUNICATION NETWORK

(75) Inventor: Hae Uk Choi, Seoul (KR)

(73) Assignee: Hyundai Electronics Ind. Co., Ltd. (KR)

( * ) Notice: Subject to any disclaimer, the term of this patent is extended or adjusted under 35 U.S.C. 154(b) by 604 days.

(21) Appl. No.: 09/770,352

(22) Filed: Jan. 26, 2001

(65) Prior Publication Data

US 2001/0019959 A1 Sep. 6, 2001

(30) Foreign Application Priority Data

Feb. 21, 2000 (KR) .......................................... 2000-8274

(51) Int. Cl.[7] .................................................. H04Q 7/20
(52) U.S. Cl. ....................... 455/423; 455/405; 370/234; 370/252; 379/112.01; 379/1.01
(58) Field of Search ................................ 455/423, 424, 455/425, 67.7, 405; 379/112.01

(56) References Cited

U.S. PATENT DOCUMENTS

| | | | | |
|---|---|---|---|---|
| 4,893,301 A | | 1/1990 | Andrews et al. | 370/58.2 |
| 5,311,572 A | | 5/1994 | Friedes et al. | 379/67 |
| 5,828,734 A | | 10/1998 | Katz | 379/93.13 |
| 5,841,853 A | | 11/1998 | Yamanishi et al. | 379/215 |
| 5,978,358 A | * | 11/1999 | Wang et al. | 370/234 |
| 6,018,567 A | * | 1/2000 | Dulman | 379/32.03 |
| 6,067,030 A | * | 5/2000 | Burnett et al. | 340/870.05 |
| 6,230,006 B1 | * | 5/2001 | Keenan et al. | 455/424 |
| 6,240,287 B1 | * | 5/2001 | Cheng et al. | 455/453 |
| 6,625,437 B1 | * | 9/2003 | Jampolsky et al. | 455/405 |

* cited by examiner

*Primary Examiner*—Edward F. Urban
*Assistant Examiner*—Duy Le
(74) *Attorney, Agent, or Firm*—Baker Botts LLP

(57) ABSTRACT

There is provided a method for calculating the call processing capacity of a mobile communication system using an Internet communication network. The present invention calculates and stores the call processing capacity of a mobile communication system using an Internet web browser and database to attain accurate call processing capacity information, thereby obtaining an optimal mobile communication system design. Furthermore, since multiple designers can share information about the calculated call processing capacity through a database, thereby making the call processing capacity information be actively effectively used.

9 Claims, 5 Drawing Sheets

METHOD FOR CALCULATING CALL PROCESSING CAPACITY OF MOBILE COMMUNICATION SYSTEM USING INTERNET COMMUNICATION NETWORK

BACKGROUND OF THE INVENTION

1. Field of the Invention

The present invention relates to a method for calculating the call processing capacity of a mobile communication system using an Internet communication network and, more particularly, to a method for calculating and storing the call processing capacity of a mobile communication system using an Internet web browser and database.

2. Description of the Related Art

In general, a mobile communication system passes through a signal processing procedure called "call" to communicate with other subscribers. The call is a request of a user for taking possession of a communication line to exchange information. That is, the call means occupation of a communication line by a subscriber for making a call. There are various kinds of calls such as a complete call accomplishing the purpose of a call, a continuous call that continuously generates on one communication line on the basis of generation time, and overlapping calls that generate on the same line at the same time.

A conventional mobile communication system performing the call processing function is described with reference to FIG. 1. The mobile communication system includes a mobile 70 by which an individual subscriber generates a call signal while moving or being at a specific location, a base station 71 for receiving the call signal from the mobile 70 to carry out the call processing function, a control station 72 for controlling communication signal processing between the base station 71 and mobile 70, and a switching center 74 connected to the control station 72 to send a request from the mobile 70 to process a call to an external communication network 73.

The call processing function of the conventional mobile communication system is now explained. First of all, the mobile 70 that is moving or is placed at a certain location sends a call signal requesting to connect with the external communication network 74 (for example, a public telephone switching network or advanced mobile phone service (AMPS), etc.) to the base station 71. Then, the base station 71 receives this call signal from the mobile 70 to transmit it to the control station 72. In addition, data requesting call processing is delivered from the mobile 70 to the base station 71, the control station 72 judges the data from the mobile 70 and transmits it to the switching center 74 (if the mobile 70 requests to be connected with the public telephone switching network, for example). The switching center 74 connects the mobile 70 to the external communication network 73 to allow them to communicate with each other.

That is, the communication function is executed in such a manner that a mobile communication system subscriber sends a call signal to the base station located in a cell for communication and this base station searches and judges the call signal to perform a requested call processing function. Accordingly, the base station processes as many calls from individual subscribers as a predetermined line capacity. To develop an optimal mobile communication system, a procedure of calculating the call processing capacity is carried out. Methods for calculating the call processing capacity of a conventional CDMA mobile communication system include a calculation method using a linear model, a method using simulation, a method using an analytic method and a calculation method on the basis of ITU-T ROMMENDATION Q543.

In the methods of calculating the call processing capacity of the conventional CDMA mobile communication system, however, high cost is required for call processing capacity calculation because the call processing calculating procedure is carried out by individual groups. Furthermore, since the call processing capacity is separately calculated by an individual processor, the calculated value is not correctly reflected on the design of the mobile communication system and reliability in the call processing calculation procedure is deteriorated.

SUMMARY OF THE INVENTION

It is, therefore, an object of the present invention to provide a method for calculating the call processing capacity of a mobile communication system using an Internet communication network, which calculates and stores the call processing capacity of the mobile communication system using an Internet web browser and database to attain correct call processing capacity information, thereby realizing an optimal mobile communication system design.

Another object of the present invention is to provide a method for calculating the call processing capacity of a mobile communication system using an Internet communication network, which allows multiple designers to share information about the calculated call processing capacity through a database, thereby making the call processing capacity information be actively effectively used.

To accomplish the objects of the present invention, there is provided a method for calculating the call processing capacity of a mobile communication system using an Internet communication network, comprising: a master operation execution step at which an Internet server system judges if the user of a terminal accessing it using a web browser of the Internet communication network requires a master operation, authenticates the user when the user does, and then inquires or corrects information of the master operation; an analysis operation data input step at which the Internet server system receives data required for an analysis operation when the user does not requires the master operation; a reference information input step at which it is judged if the user executes a new operation corresponding to calculation of the call processing capacity of the corresponding communication system after the analysis operation data input step, and reference information in accordance with the call processing calculation capacity is inputted when the user requires the new operation; a reference call processing capacity information calculation step of calculating reference call processing capacity information based on the inputted reference information; and a call processing capacity calculation step of calculating BHCA that is the final call processing capacity of a processor on the basis of the calculated reference call processing capacity information and outputting the result.

DETAILED DESCRIPTION OF THE PREFERRED EMBODIMENT

Reference will now be made in detail to the preferred embodiments of the present invention, examples of which are illustrated in the accompanying drawings.

Figure 1:
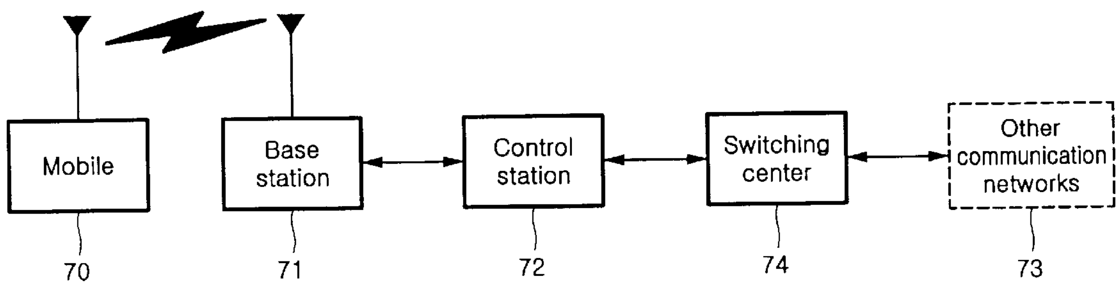
FIG. 1 is a block diagram of a conventional mobile communication system.
Figure 2:
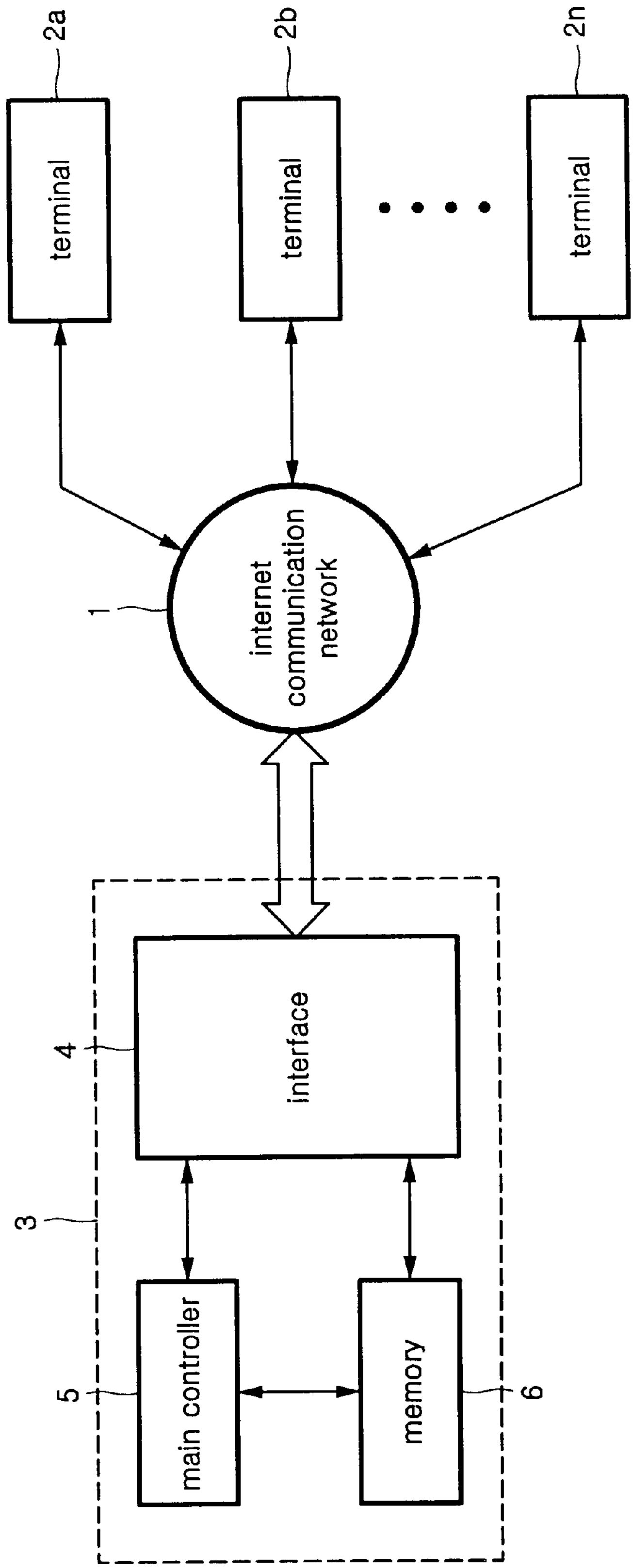
FIG. 2 is a block diagram of an Internet system to which the method of the present invention is applied.

Referring to FIG. 2, an Internet system to which the method of the present invention is applied includes a plurality of terminals 2*a* to 2*n* connected to an Internet communication network 1 to process and operate call processing information of a mobile communication system using a web browser of the Internet communication network 1, and an Internet server 3 connected to the terminals 2*a* to 2*n* via the Internet communication network 1 to execute a call processing capacity calculating function. The Internet server 3 contains an application program for calculation of the call processing capacity. In addition, the Internet server 3 has an interface 4 for interfacing an external signal received through the Internet communication network 1, a main controller 5 for processing call processing capacity information received through the interface 4, and a memory 6 for storing the processed call processing capacity information or processed data according to a storage control signal of the main controller 5.

Figure 3:
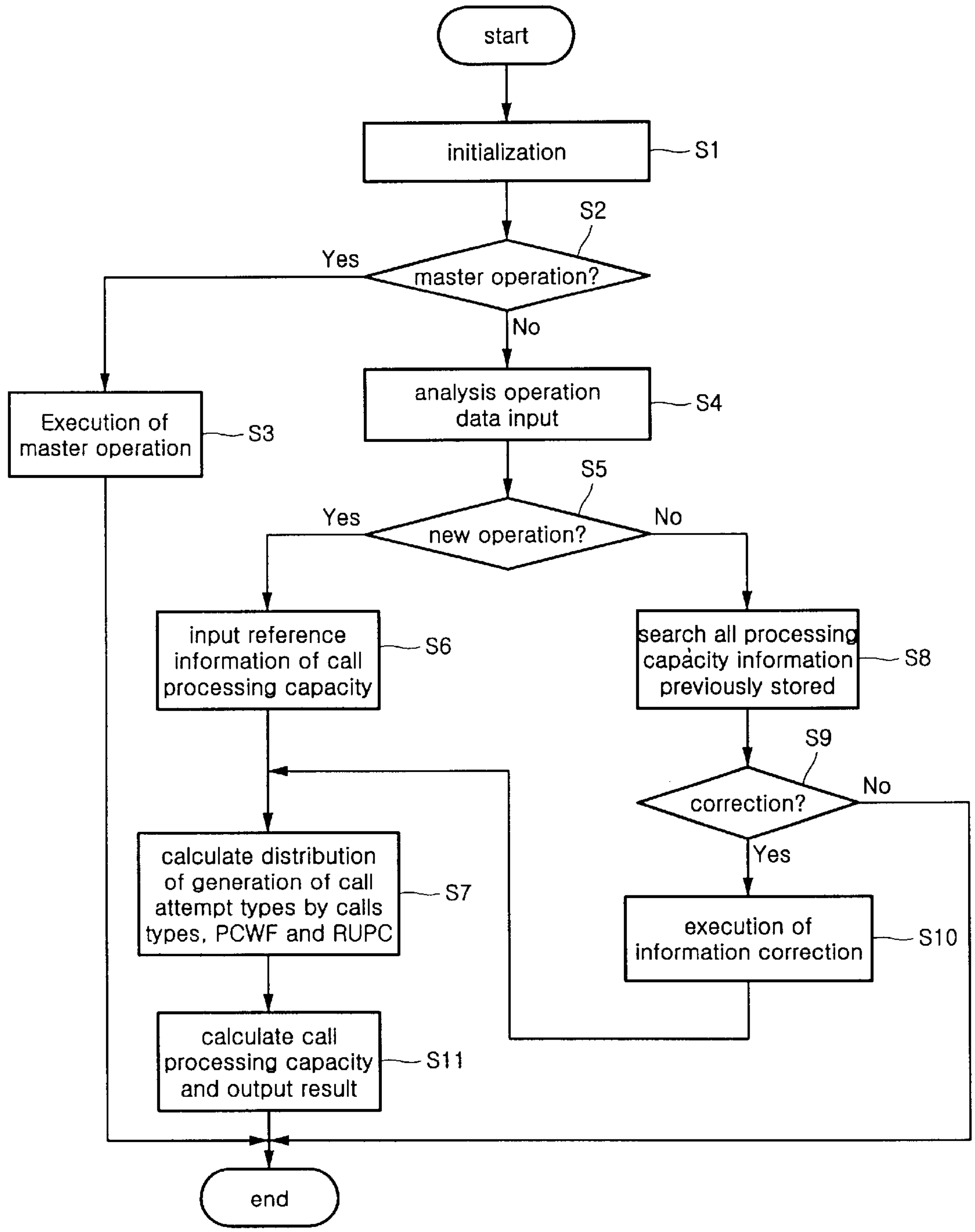
FIG. 3 is a flow diagram showing the method for calculating the call processing capacity of a mobile communication system using an Internet communication network.

A method of the present invention applied to the aforementioned system is now explained. Referring to FIG. 3, the Internet server system goes to a processing operation judgement step S2 from its initial state S1 to judge if a current terminal user requires a master operation. When it is judged that the user does, the Internet server performs the master operation at a mater operation execution step S3. For example, the Internet server inquires and corrects information about a communication proprietor, a destination system, a call type, a call attempt type, etc. On the other hand, when it is judged that the terminal user does not require the master operation at the step S2, the Internet server system goes to an analysis operation data input step S4 to input data required for the analysis operation, that is, information about a proprietor who is the object of analysis, an object system (site) and a destination system. After the analysis operation data input step S4, the Internet server judges if the terminal user requires a new operation in accordance with calculation of the call processing capacity of corresponding mobile communication system at a new operation judgement step S5. When the user does, the Internet server goes to a reference information input execution step S6 to input reference information according to call processing capacity calculation. Thereafter, the Internet server system inputs data in accordance with distribution of generation of each of call attempt types by call types, PCWF and RUPC (Reference Unit Processing Capacity) that is the number of reference calls which can be processed when CPU occupation rate of each processor is 90% and calculates them at a reference call capacity information calculation step S7. After this, the procedure goes to a call processing capacity calculation step S11.

Meanwhile, when it is judged that the terminal user does not require the new operation at the new service judgement step S5, the Internet server system searches for information on the call processing calculation capacity of the corresponding mobile communication system, previously stored, to user it at a stored information search execution step S8. Then, it goes to an information correction step S9 to judge if the content of the call processing capacity information currently being used is corrected. When there is no request for information correction, the procedure goes to an ending step. On the other hand, when the terminal user wants to correct the content of the stored call processing capacity information, the Internet server system corrects the information at a correction execution step S10 and then goes to the reference call information capacity calculation step S7.

In the reference call information capacity calculation step S7, the Internet server system calculates BHCA that is the final call processing capacity of the processor on the basis of the distribution of generation of each of call attempt types by call types, PCWF and RUPC which are obtained at the previous steps and outputs the calculated result.

That is, when a certain user requires calculation of the call processing capacity of a mobile communication system placed at a specific location, he accesses the Internet server 3 including the application program for calculating the call processing capacity using his terminal 2*b* through the web browser of the Internet communication network 1. Then, the main controller 5 of the Internet server 3 receives the request signal requiring calculation of the call processing capacity from the user via the interface 4 and displays on the user's terminal 2*b* an authentication screen inquiring if the user is an authenticated one capable of accessing the call processing capacity calculation information via the Internet communication network 1.

Figure 4:
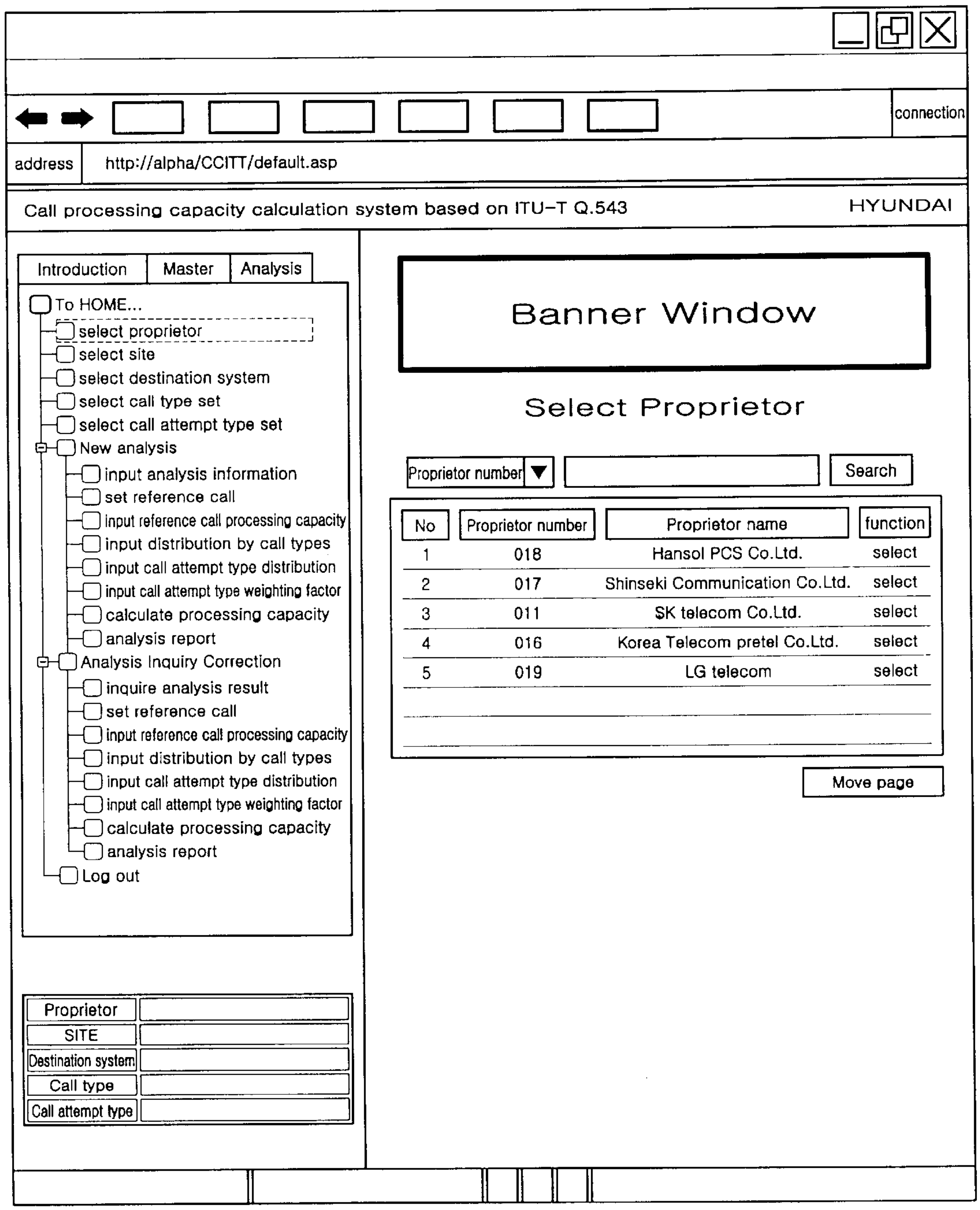
FIG. 4 shows the menu according to an master operation in the present invention.

When the user inputs his user ID and password through his terminal 2*b* to be authenticated, the main controller 5 of the Internet server 3 displays a menu inquiring execution of the master operation related with the call processing capacity calculation on the screen of the terminal 2*b* that accesses the Internet server through the web browser, as shown in FIG. 4. Upon the authenticated terminal user selecting the master operation, the main controller 5 displays a submenu related with the master operation on the terminal 2*b*. This submenu is for correcting or adding a communication proprietor, an object system, a destination system, a call type, a call attempt type, etc., as shown in FIG. 4. When the authenticated user corrects or inquires master information with reference to the submenu displayed on his terminal 2*b*, the main controller 5 of the Internet server 3 receives these input signals through the interface 4 to correct or inquire the master information stored in the memory 6 and then displays the result on the screen of the terminal 2*b*.

Figure 5:
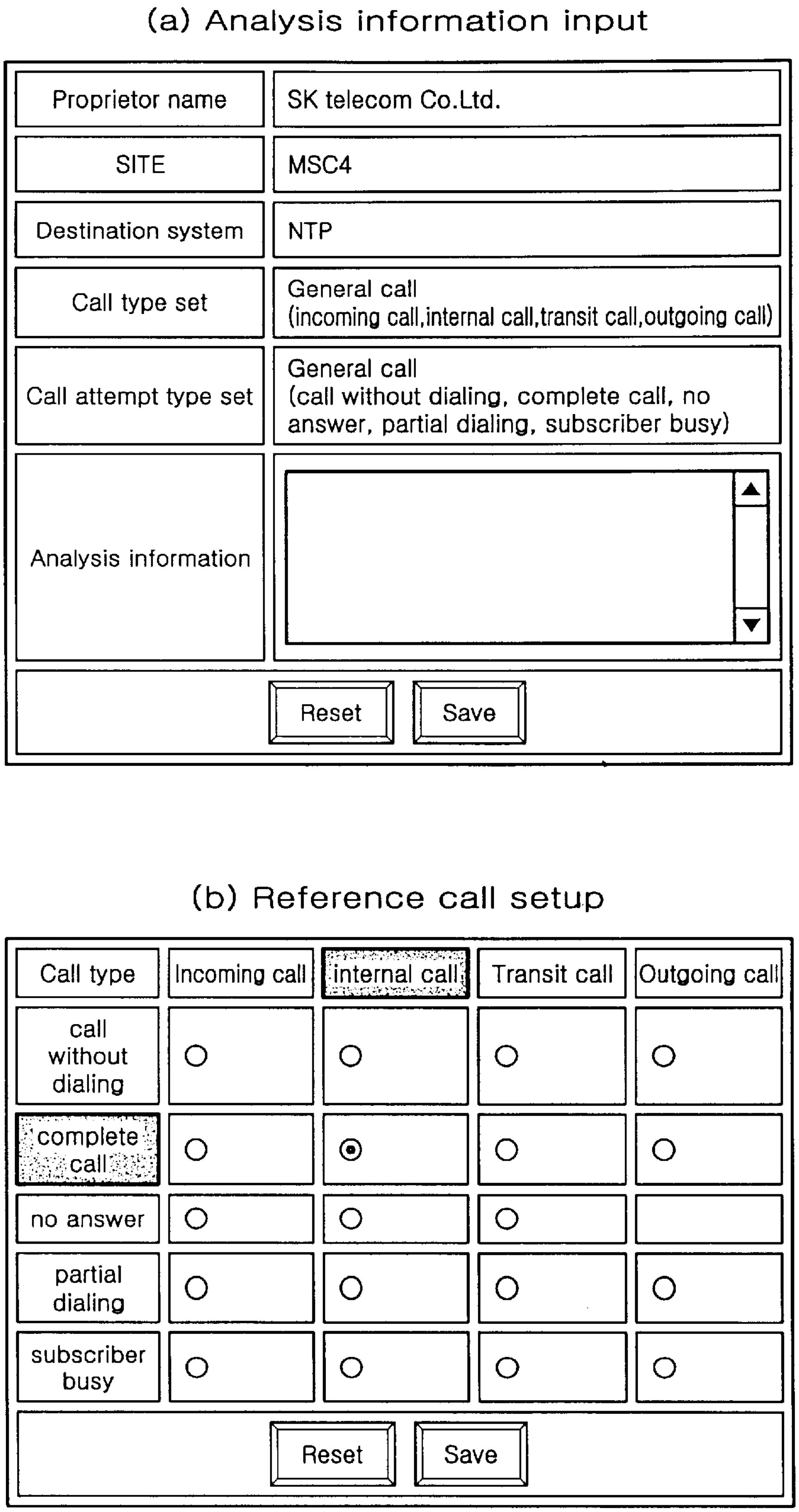
FIGS. 5A and 5B show the menu according to an analysis operation and the menu according to reference call setup in the present invention, respectively.

Meanwhile, when the authenticated user selects the analysis operation from the menu inquiring execution of the master operation, the main controller 5 displays a submenu related with the analysis operation on the screen of the terminal 2*b* through the Internet communication network 1, as shown in FIG. 5A. This submenu is for inquiring information about a proprietor who is the object of analysis, an object system and a destination system. The authenticated user inputs data about these through his terminal 2*b*. The user terminal receives information related with the master operation such as an arbitrary communication proprietor as the object proprietor, a base station control system located in a certain area as the object system and an address assignment system as the destination system, for example. Upon completion of the above procedure, the main controller 5 displays a submenu inquiring execution of the new operation related with the call processing capacity calculation on the terminal 2*b* of the user through the Internet communication network 1.

When the user selects inquiry or correction of an existing analysis result from the submenu displayed on his terminal 2*b*, the main controller 5 of the Internet server 3 transmits information related with the call processing capacity calculation, stored in the memory 6, to the terminal 2*b*. Then, the authenticated user searches for information displayed on his terminal 2*b* to correct or inquire it. Here, the main controller 5 of the Internet server 3 updates the information stored in the memory with the information corrected by the authenticated user.

On the other hand, when the user selects the new operation for calculating the call processing capacity, the main controller 5 of the Internet server 3 displays a reference value parameter input menu on the terminal 2*b* of the authenticated user through the Internet communication network 1, as shown in FIG. 5B. That is, the main controller 5 requests the user to input parameter information such as reference call setup, reference call processing capacity, distribution by call types, distribution by call attempt types, call attempt weighting factor, etc. When the user inputs this parameter information, the main controller 5 calculates the call processing capacity on the basis of the inputted information.

For example, in case where the call processing capacity of an address assignment system of a base station controller placed in a specific area is calculated, the main controller receives parameter reference values inputted by the authenticated user, that is, parameter values for call types such as an internal call, outgoing call, incoming call and transit call and parameter values for call attempt types such as call without dialing, call with partial dialing, called subscriber busy, no answer from called subscriber and complete call. Here, to calculate the call processing capacity of the system requires setup of a reference call. In case of the address assignment system, a full call is selected as the reference call because, when one call is processed, its originating portion and terminating portion are simultaneously processed. That is, a complete internal call is selected as the reference call. To calculate the reference call processing capacity of each processor, each processor is assumed to be used for call processing until its CUP occupation rate reaches 90% because the switching center TDX-10 system can sufficiently satisfy recommendation values for delay time even when the processor CPU occupation rate that can be used for call processing is 90% in maximum with respect to service-based delay time and introduction of new services.

Accordingly, the main controller 5 of the Internet server 3 defines RUPC that is the reference call processing capacity as the number of reference calls which can be processed when the CPU occupation rate of each processor is 90%, and then calculates it.

Meanwhile, to calculate weighting factors for the reference calls of the outgoing call, incoming call and transit call after the RUPC calculation procedure, the main controller 5 calculates the outgoing call processing capacity, incoming call processing capacity and transit call processing capacity that indicate the number of the calls which can be processed when the CPU occupation rate of the processor is 90% using a method similar to the above one. Upon completion of calculation of the processing capacity by call types as described above, the weighting factor WF(i, i=1, . . . , 4) of a call whose type is i is calculated as follows.

WF(1)=1

WF(2)=RUPC/outgoing call processing capacity

WF(3)=RUPC/incoming call processing capacity

WF(4)=RUPC/transit call processing capacity

Meantime, the main controller 5 defines PCWF(Partial Call Weighting Factor) as the weighting factors of the partial call and call without dialing among the call attempt types as follows to consider a variation in processing time of the processor according to the progressive state of a call.

That is, PCWF(i, j) represents the processing capacity of the processor, which is required for a call whose call attempt type is j among calls whose types are i when the processing capacity of the processor required for "complete call" of the i calls is 1. This PCWF can be calculated through an indirect method such as actual measurement or comparison of the numbers of program instruction words.

Accordingly, when there are given p(i)(i=1, . . . , 4) that indicates the proportion of calls whose types are i among the entire calls applied to the processor and x(i, j) that indicates the call whose call attempt type is j among the i calls, BHCA that is the call processing capacity of the processor is as follows.

$$BHCA = \frac{RUPC}{\sum P(i)[WF(i) \times \sum PCWF(i, j)]} = \frac{RUPC}{WFa}$$

Upon completion of calculation of BHCA through the above procedure, the main controller 5 of the Internet server 3 stores this information in the memory 6 and displays the result on the terminal 2*b* of the authenticated user. Here, the aforementioned call processing capacity calculating method is based on ITU-T Recommendation Q543.

As described above, the present invention calculates and stores the call processing capacity of a mobile communication system using an Internet web browser and database to attain accurate call processing capacity information, thereby obtaining an optimal mobile communication system design. Furthermore, since multiple designers can share information about the calculated call processing capacity through a database, thereby making the call processing capacity information be actively effectively used.

What is claimed is:

1. A method for calculating the call processing capacity of a mobile communication system using an Internet communication network, comprising:

a master operation execution step at which an Internet server system judges if the user of a terminal accessing it using a web browser of the Internet communication network requires a master operation, authenticates the user when the user does, and then inquires or corrects information of the master operation;

an analysis operation data input step at which the Internet server system receives data required for an analysis operation when the user does not requires the master operation;

a reference information input step at which it is judged if the user executes a new operation corresponding to calculation of the call processing capacity of the corresponding communication system after the analysis operation data input step, and reference information in accordance with the call processing calculation capacity is inputted when the user requires the new operation;

a reference call processing capacity information calculation step of calculating reference call processing capacity information based on the inputted reference information; and a call processing capacity calculation step of calculating BHCA that is the final call processing capacity of a processor on the basis of the calculated reference call processing capacity information and outputting the result.

2. The method as claimed in claim 1, further comprising a stored information search step of searching call processing capacity information of the corresponding communication system, previously stored, when the user does not require the new operation corresponding to calculation of the call processing capacity at the reference information input step, and an information correction step of, when the user requests for correction of the content of the call processing capacity information currently being stored in a memory of the Internet server after the stored information search step, correcting the information and then storing it.

3. The method as claimed in claim 1, wherein the master operation execution step carries out the master operation which inquires and corrects information such as a communication proprietor, a destination system, a call type, a call attempt type, etc.

4. The method as claimed in claim 3, wherein the call attempt types include a call without dialing, call with partial dialing, called subscriber busy, no answer from called subscriber and complete call.

5. The method as claimed in claim 3, wherein the call types include an internal call, outgoing call, incoming call and transit call.

6. The method as claimed in claim 1, wherein the analysis operation data input step receives information such as a communication proprietor, a destination system, a call type, a call attempt type, etc. as data required for the analysis operation.

7. The method as claimed in claim 1, wherein the reference call processing capacity calculation step calculates distribution of generation of each of call attempt types by call types, PCWF and RUPC as the reference call processing capacity information.

8. The method as claimed in claim 1, wherein the BHCA that is the final call processing capacity is calculated on the basis of the following expression:

$$BHCA = \frac{RUPC}{\sum P(i)[WF(i) \times \sum PCWF(i, j)]} = \frac{RUPC}{WFa}$$

where RUPC represents the number of reference calls which can be processed when the CPU occupation rate of each processor is 90%, WF represents weighting factors for the reference calls, P(i) denotes the proposition of a call whose type is i, and (i, j) indicates a call whose call attempt type is j among the i calls.

9. The method as claimed in claim 8, wherein the WF is calculated based on a call type i(1, 2, 3, 4) as follows:

WF(1)=1

WF(2)=RUPC/outgoing call processing capacity

WF(3)=RUPC/incoming call processing capacity

WF(4)=RUPC/transit call processing capacity.

* * * * *